(12) United States Patent
Brown et al.

(10) Patent No.: US 9,308,685 B2
(45) Date of Patent: Apr. 12, 2016

(54) PLASTIC BOTTLE LOG TRIMMER AND METHOD

(75) Inventors: John Brown, Felton, PA (US); John M. Mathy, Jr., Stewartstown, PA (US)

(73) Assignee: Graham Engineering Corporation, York, PA (US)

( * ) Notice: Subject to any disclaimer, the term of this patent is extended or adjusted under 35 U.S.C. 154(b) by 530 days.

(21) Appl. No.: 13/696,443

(22) PCT Filed: May 12, 2011

(86) PCT No.: PCT/US2011/036168
§ 371 (c)(1),
(2), (4) Date: Nov. 6, 2012

(87) PCT Pub. No.: WO2011/149679
PCT Pub. Date: Dec. 1, 2011

(65) Prior Publication Data
US 2013/0047806 A1   Feb. 28, 2013

Related U.S. Application Data

(60) Provisional application No. 61/347,674, filed on May 24, 2010.

(51) Int. Cl.
| | | |
|---|---|---|
| *B29C 49/74* | (2006.01) | |
| *B26D 7/26* | (2006.01) | |
| *B29L 31/00* | (2006.01) | |

(52) U.S. Cl.
CPC .......... *B29C 49/74* (2013.01); *B26D 2007/2657* (2013.01); *B29L 2031/7158* (2013.01); *Y10T 83/0448* (2015.04); *Y10T 83/6548* (2015.04)

(58) Field of Classification Search
CPC ...... B29C 49/74; B29C 49/72; B29C 49/725; B23D 33/025; B26D 5/02; B26D 5/04; B26D 5/06; B26D 2007/2657
USPC ............ 83/914, 946, 54, 320, 294, 319, 681, 83/683, 293, 563, 566, 567, 569, 564; 425/527, 806; 264/536, 161, 150, 159
See application file for complete search history.

(56) References Cited

U.S. PATENT DOCUMENTS 2,988,776 A * 6/1961 Schaich ................. B29C 49/50
264/542
3,244,788 A * 4/1966 Michel ............. B29C 45/14598
264/267

(Continued)

FOREIGN PATENT DOCUMENTS

BR  WO 2004078444 A2 *  9/2004  ............. B29C 49/60
CA       2220397       *  5/1998

(Continued)

OTHER PUBLICATIONS

Korean Patent Office, International Search Report in corresponding PCT application PCT/US2011/036168, Feb. 8, 2012, 8 pages.

(Continued)

*Primary Examiner* — Kenneth E. Peterson
*Assistant Examiner* — Jennifer Swinney
(74) *Attorney, Agent, or Firm* — Hooker & Habib, P.C.

(57) ABSTRACT

A rotary trimmer for trimming flash and the blow dome from a plastic bottle forming a portion of a plastic blow molded log discharged from a blow mold includes flash punching, a neck support plate, and a guillotine blade. The neck support plate is movable by a plate drive to move adjacent the neck of the plastic log to support the neck during cutting of the blow dome and cooperates with a log holder to essentially support the entire outer periphery of the neck. The guillotine blade is movable by a blade drive to pass through the plastic log and sever the blow dome from the neck of the log.

9 Claims, 12 Drawing Sheets

(56) References Cited

U.S. PATENT DOCUMENTS

| | | | |
|---|---|---|---|
| 3,319,498 A * | 5/1967 | Wolford | B29C 49/72 264/161 |
| 3,417,428 A * | 12/1968 | Rupert | 425/527 |
| 3,570,087 A | 3/1971 | Palsa | |
| 3,610,492 A * | 10/1971 | Bourgeois | 225/95 |
| 3,656,385 A * | 4/1972 | Kimbrell | 83/290 |
| 3,797,985 A * | 3/1974 | Garver | 425/537 |
| 4,361,531 A | 11/1982 | Black | |
| 4,653,368 A * | 3/1987 | Riera et al. | 83/319 |
| 4,834,643 A | 5/1989 | Klinedinst et al. | |
| 5,167,968 A * | 12/1992 | Dunlap et al. | 425/302.1 |
| 5,202,135 A * | 4/1993 | Yawn | 425/527 |
| 5,617,768 A * | 4/1997 | Palazzolo | 82/47 |
| 5,967,010 A | 10/1999 | van Manen | |
| 6,360,414 B1 | 3/2002 | Maddox et al. | |
| 7,316,796 B2 | 1/2008 | Krohn et al. | |
| 7,441,486 B2 | 10/2008 | Fiorani et al. | |
| 7,607,375 B2 * | 10/2009 | Harding | B29C 66/022 82/47 |
| 7,717,020 B2 | 5/2010 | Fiorani et al. | |
| 7,739,933 B2 | 6/2010 | Fiorani et al. | |
| 7,752,947 B2 | 7/2010 | Fiorani et al. | |
| 2004/0011169 A1 | 1/2004 | Marshall et al. | |
| 2004/0050220 A1 | 3/2004 | Proffitt | |
| 2005/0284275 A1 | 12/2005 | Schnabel et al. | |
| 2006/0071361 A1 | 4/2006 | Fiorani et al. | |
| 2008/0042314 A1 | 2/2008 | Fiorani et al. | |
| 2008/0314216 A1 * | 12/2008 | Delgado | B29D 30/1635 83/452 |

FOREIGN PATENT DOCUMENTS

| | | | |
|---|---|---|---|
| DE | 29808312 U1 | | 8/1998 |
| FR | 1499446 | * | 10/1967 |
| JP | S5579112 A | | 4/1980 |
| JP | 11240065 | * | 9/1999 |
| JP | 2000263636 A | | 9/2000 |

OTHER PUBLICATIONS

EPO, Supplementary Search Report in corresponding EP11787114, Apr. 21, 2015, 9 pages.

* cited by examiner

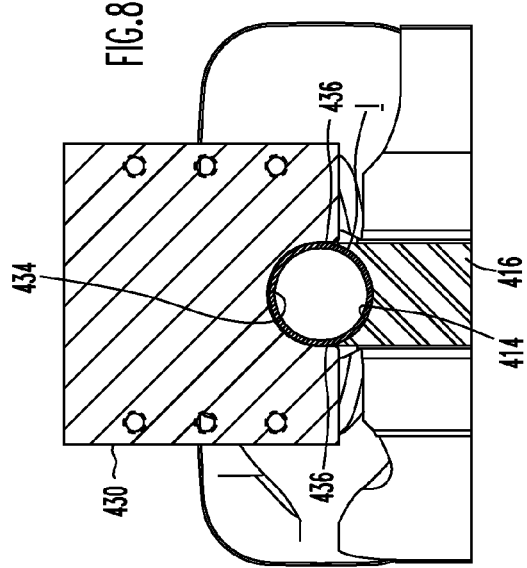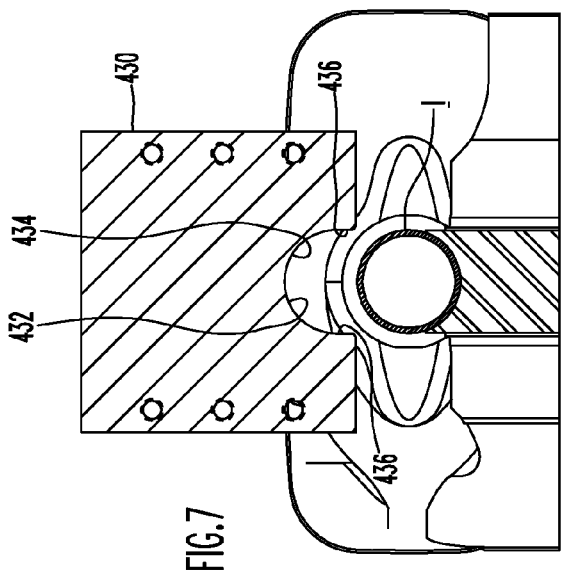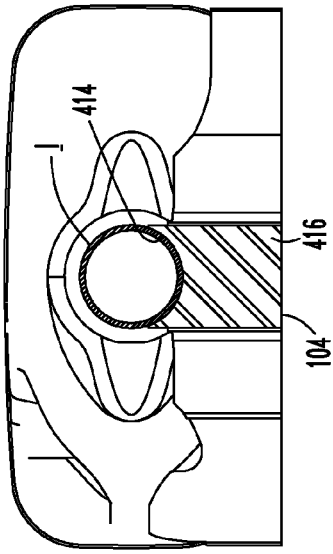

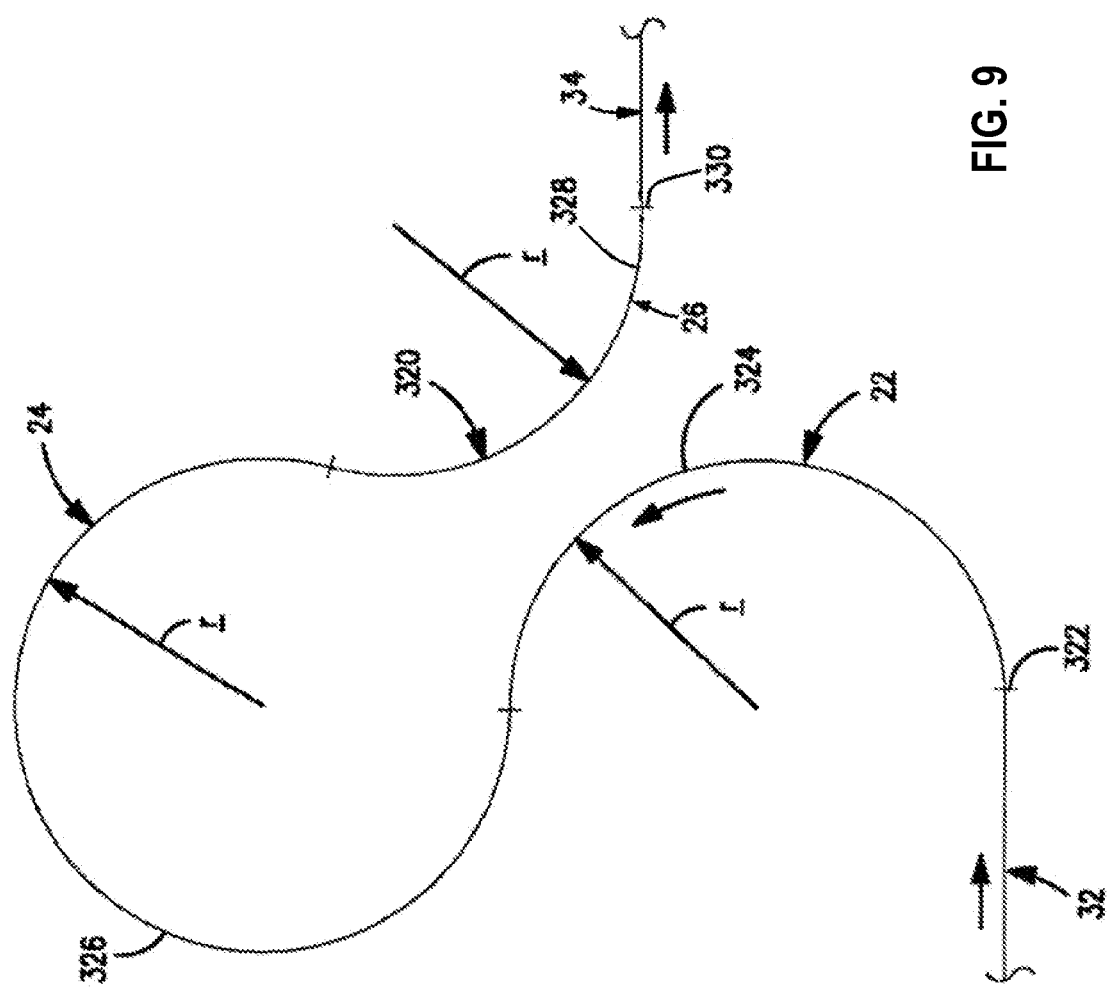

PLASTIC BOTTLE LOG TRIMMER AND METHOD

CROSS REFERENCE TO RELATED APPLICATIONS

This application is a continuation of and claims priority under 35 U.S.C. §120 to PCT Application No. PCT/US2011/036168 filed May 12, 2011, which claimed priority to U.S. Provisional Application No. 61/347,674 filed May 24, 2010. The contents of both of these priority applications are hereby incorporated by reference in their entirety.

FIELD OF THE INVENTION

The invention relates to machines and methods for trimming plastic from blow molded plastic bottles.

BACKGROUND OF THE INVENTION

FIG. 1 illustrates a single plastic bottle log H as ejected from a blow molding machine with tail flash removed. The log H includes a neck I located on an axis offset D to one side of the bottle. A moil or blow dome J extends away from the neck I. Neck flash K extends from the sides of the bottle, neck, and blow dome. The neck flash is formed at the parting lines of the molds adjacent the bottle neck and is located in a common plane extending through the neck axis and parallel to the drawing sheet as seen in FIG. 1. The neck flash K and the blow dome J must be trimmed away.

Conventional blow dome trimmers linearly index a lead bottle of a series of bottles to a stationary punching station where the bottle is held stationary while the flash is trimmed away. After trimming, the bottle is released, moved downstream and a new bottle is indexed to the station.

A blow dome is conventionally trimmed from the neck of a blow molded bottle by rotating the bottle and moving the neck along a cutter which severs the blow dome from the neck. Alternatively, the blow dome may be cut away by a guillotine type blade.

Fiorani et al. U.S. Pat. No. 7,441,486, owned by the owner of this application, discloses a rotary trimmer that has a flash station to trim flash and a blow dome station to trim the blow dome from blow-molded plastic bottle logs. Fiorani et al. U.S. Pat. No. 7,441,486 is incorporated by reference into this specification as if fully set forth herein.

At the time the invention disclosed herein was made, the applicants were subject to an obligation of assigning the invention disclosed herein to the owner of U.S. Pat. No. 7,411,486. The applicants have assigned the invention to the same owner of U.S. Pat. No. 7,411,486.

The flash station wheel 24 continuously rotates about a horizontal axis as indicated by the curved arrow adjacent the wheel 24 in FIG. 13. A number of mounting plates are carried on the outside of the wheel. Each mounting plate carries a nest or log holder 98 and a set of flash punch tooling 112. The tooling set is associated with the log holder and includes a flash punch assembly. The flash punch assembly holds punches that pass through the flash to trim the flash away from a log carried in the associated log holder.

FIGS. 13 and 14 are copied from FIGS. 5 and 12 respectively of the '486 patent. References numbers and letters shown in FIGS. 13 and 14 are described in the '486 patent. FIGS. 13 and 14 illustrate a rotary trimmer 10 for trimming plastic bottle logs ejected from a blow molding machine. An infeed conveyor 32 supplies untrimmed logs to the trimmer 10, and a discharge conveyor 34 removes trimmed logs from the trimmer 10. The trimmer 10 includes a neck flash trim wheel 24 at the flash station and a spin trim wheel 28 at the blow dome station. An infeed star wheel 22 transfers blow-molded plastic bottle logs from the infeed conveyor 32 to the neck flash trim wheel 24. An intermediate star wheel 26 transfers the logs from the neck flash trim wheel 24 to the spin trim wheel 28. A discharge star wheel 30 transfers logs from the spin trim wheel 28 to the discharge conveyor 34.

The spin station wheel 28 rotates about a parallel horizontal axis. A number of log holders are carried on the outside of the wheel. The log holders are themselves rotatable about an axis and spin the logs about the neck axis. The blow domes are spun against a stationary knife extending partially around the wheel axis to trim the blow dome from the bottle neck.

The rotary trimmer forms a high-speed production line that receives untrimmed plastic logs from a blow molding machine and continuously moves the logs along the production line for removing flash and trimming blow domes.

It would be advantageous if the flash station could be modified to enable flash and the blow dome to be trimmed at a single station. Further, it would be advantageous if the blow dome is removed using a guillotine-type blade. Some blow domes are too thin to be trimmed by spin trimming.

BRIEF SUMMARY OF THE INVENTION

The flash station is modified to enable flash and the blow dome to be trimmed at a single station. The blow dome is removed using a guillotine-type blade.

The flash station is modified with the carrier that carries the flash punch to also carry a guillotine blade and a neck support plate. The neck support plate is movable by a plate drive to move adjacent the neck of the plastic log to support the neck during cutting of the blow dome. Preferably the neck support plate cooperates with the log holder to essentially support the entire outer periphery of the neck. The guillotine blade is movable by a blade drive to pass through the plastic log and sever the blow dome from the neck of the log.

Other objects and features of the invention will become apparent as the description proceeds, especially when taken in conjunction with the accompanying ten drawings illustrating two embodiments of the invention.

BRIEF DESCRIPTION OF THE DRAWINGS

FIG. 6 is a sectional view taken along lines 6-6 of FIG. 2;

FIG. 7 is a sectional view similar to FIG. 6 but with the flash station as shown in FIG. 4;

FIG. 8 is a sectional view similar to FIG. 7 but with the flash station as shown in FIG. 5;

FIG. 9 illustrates the path of movement of a log to and from the flash station;

DESCRIPTION OF THE PREFERRED EMBODIMENTS

The illustrated embodiment is a rotary trimmer of the type disclosed in the '486 patent and having a modified flash station that enables both the flash and the blow dome to be trimmed from the logs at the same trimming station. The blow dome is trimmed using a guillotine-type blade.

FIGS. 2-8 illustrate the modified flash station in accordance with the present invention. Only modifications from the flash station disclosed in the '486 patent are shown or described. Component parts of the flash station that correspond to the same component parts of the flash station disclosed in the '486 patent are numbered with the same reference numbers as used in the '486 patent.

Figure 1:
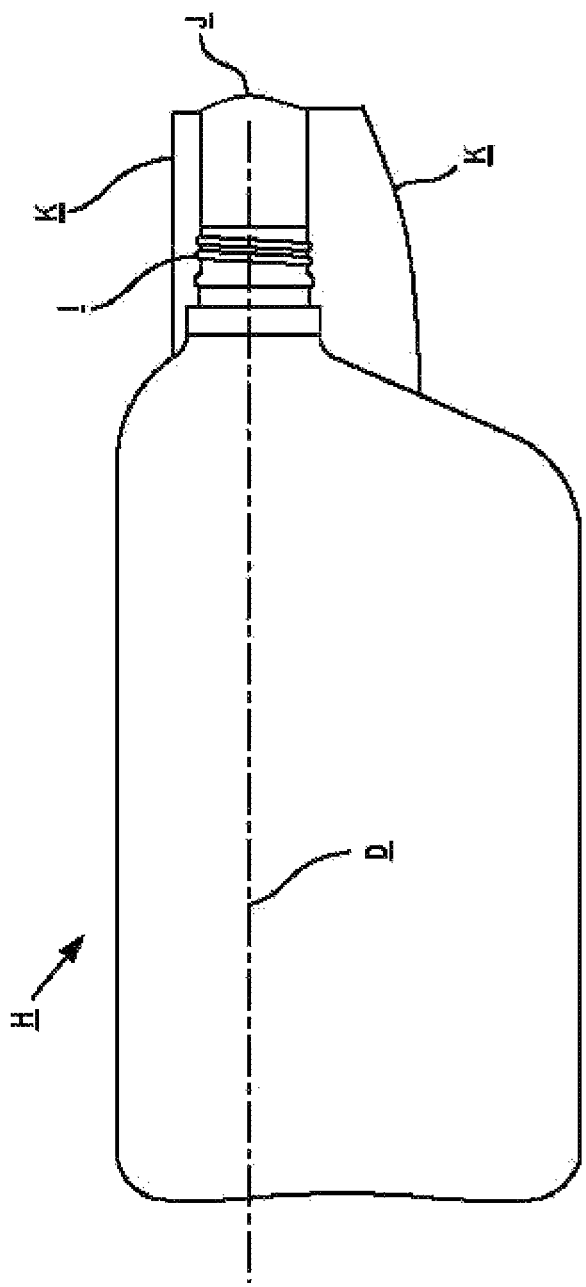
FIG. 1 illustrates an untrimmed plastic bottle log having a neck and a blow dome and flash to be trimmed from the log.
Figure 2:
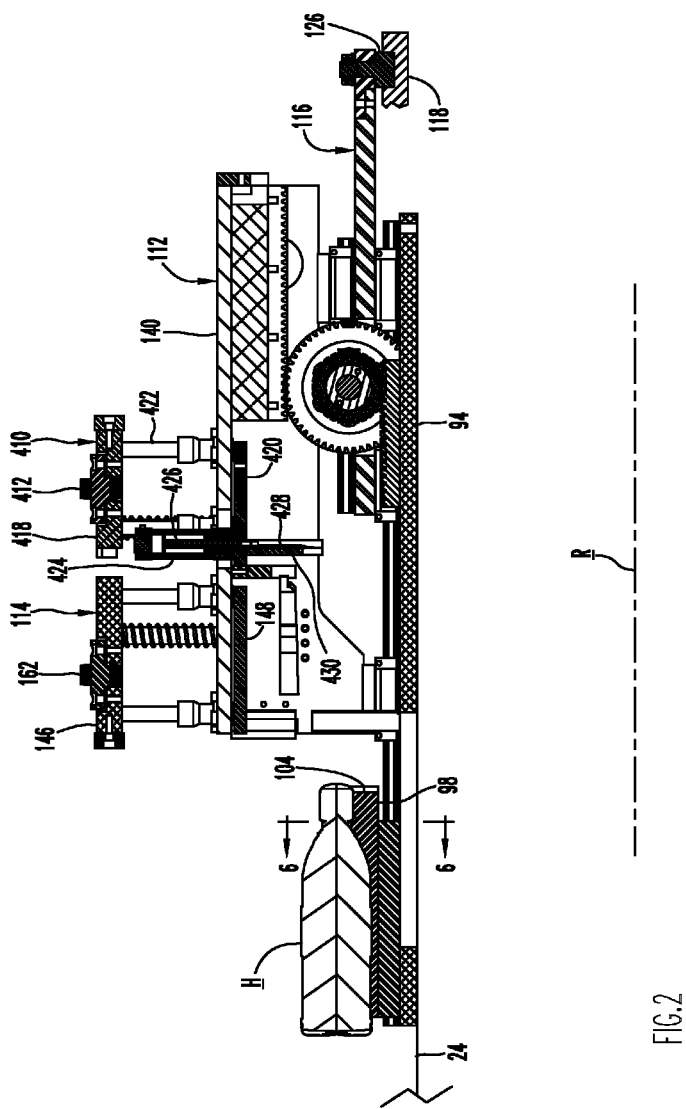
FIG. 2 is a vertical sectional view of a flash station in accordance with the present invention immediately after the log holder receives a plastic bottle log to be trimmed.

FIG. 2 illustrates a mounting plate 94 carried on the outside circumference of a rotatable wheel 24, the wheel 24 rotatable about an axis of rotation R. The mounting plate or log carrier 94 carries a log holder 98 and a set of flash punch tooling 112. As can be seen in FIG. 2, the log holder 98 is configured to hold the specific style or shape log being trimmed. An untrimmed plastic log H is shown carried by the log holder 98.

The flash punch tooling 112 includes a flash punch assembly 114, a guillotine assembly or blow dome trim assembly 410 adjacent the flash punch assembly 114, and a drive assembly 116. The flash punch assembly 114 and the blow dome trim assembly 410 are mounted on a common carrier or top plate 140 connected to the drive assembly 116 for conjoint movement. The drive assembly 116 includes a cam follower 126 guided by a stationary cam guide 120 extending circumferentially around a portion of the outer periphery of the wheel 24. The drive assembly 116 drives the flash punch assembly 114 and the blow dome trim assembly 410 towards and away from the log holder 98.

A second drive assembly drives the flash punch assembly 114. The second drive assembly includes a roller cam follower 162 attached to the top of the flash punch assembly 114. The cam follower 162 is guided by a stationary cam 120 having a guide surface 164 extending circumferentially along a portion of the outer periphery of the wheel 24. The second drive assembly drives the flash punch assembly 114 from a retracted position shown in FIG. 2 through a stroke to trim the flash from the plastic log H. A third drive assembly similar to the second drive assembly drives the blow dome trim assembly 410. The third drive assembly includes a roller cam follower 412 attached to the top of the blow dome trim assembly 410 and guided by a stationary guide surface 413 (similar to the guide surface 164) on the cam 120. The third drive assembly drives the blow dome trim assembly 410 from a retracted position shown in FIG. 2 through a stroke to trim the bottle log blow dome J.

The log holder 98 includes a bottle neck and blow dome support 104 that supports the neck I and the blow dome J of the bottle H. The support 104 is similar to the support 104 disclosed in the '486 patent, but is modified to enable trimming of the blow dome. The top surface 414 of the support portion 416 supporting the neck I conforms to the shape of the neck, see FIG. 6. The surface 414 extends less than 180 degrees around the bottom half of the neck and the support portion 416 has a width less than the diameter of the neck. This prevents the thickness of the flash K from interfering with the seating of the neck in the support portion 416, and enables the extreme outer sides of the neck above the support portion 416 to extend outwardly and proud of the support portion 416.

The illustrated neck support surface 414 is a smooth surface. In other embodiments the surface 414 could include a bead or could be profiled to conform to the neck threads to assist in positioning the bottle H in the log holder 98.

The blow dome trim assembly 410 includes a top plate 418 and a bottom plate 420, similar in function to the top plate 146 and the bottom plate 148 of the flash punch assembly 114. The top plate 418 carries the roller cam follower 412. The plates 418, 420 are movable together along a linear stroke path defined by a set of elongate guide posts 422. Attached to the upper side of the bottom plate 420 is a double-acting pneumatic cylinder 424. Extending out of the cylinder and through a hole in the plate 420 is a piston rod 426 that carries a conventional guillotine-type blade 428. Attached to the bottom side of the plate 420 immediately adjacent the blade opening is an upper neck support plate 430. The support plate 430 has a thickness equal to the length of the neck I.

The neck support plate 430 has a bottom surface 432 that conforms to the shape of the neck, see FIG. 7. The surface 432 has an arcuate portion 434 that extends about 180 degrees, and two parallel wall portions 436 that extend vertically a short distance from the ends of the arcuate portion 434.

FIG. 2 illustrates the flash station immediately after the log holder 98 receives the plastic bottle log H to be trimmed. The cam follower 126 has placed the flash punch assembly 114 and the blow dome trim assembly 410 in their retracted positions. The assemblies 114 and 410 are each in their return or raised positions along their respective stroke paths. The pneumatic cylinder 424 is also in its refracted position.

Figure 3:
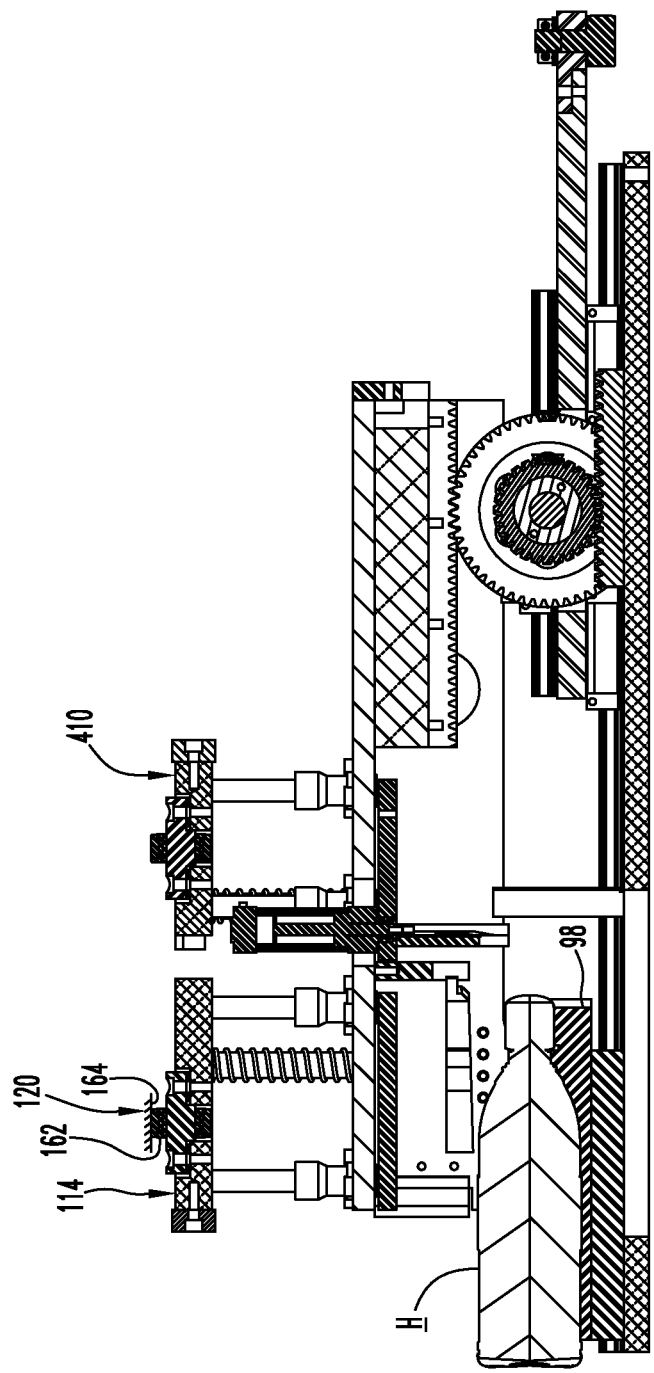
FIG. 3 is similar to FIG. 2 but illustrates the flash station immediately before the flash punch assembly begins its stroke to trim flash from the log.

Continued rotation of the wheel 24 station places the flash punch assembly 114 in its extended operating position over the bottle log H as shown in FIG. 3 for trimming the flash K. The cam roller 162 then forces the flash punch assembly 114 to move along its punch stroke towards and away from the bottle log H. The punch blades move through the plane of the flash and sever the flash from the bottle log H. The portions of the log holder 98 supporting the neck and blow dome are clear of the punches and do not interfere with the punches during flash trimming. The blow dome trim assembly 410 remains in its raised position in its stroke during movement of the flash punch assembly 114 along its punch stroke.

Figure 4:
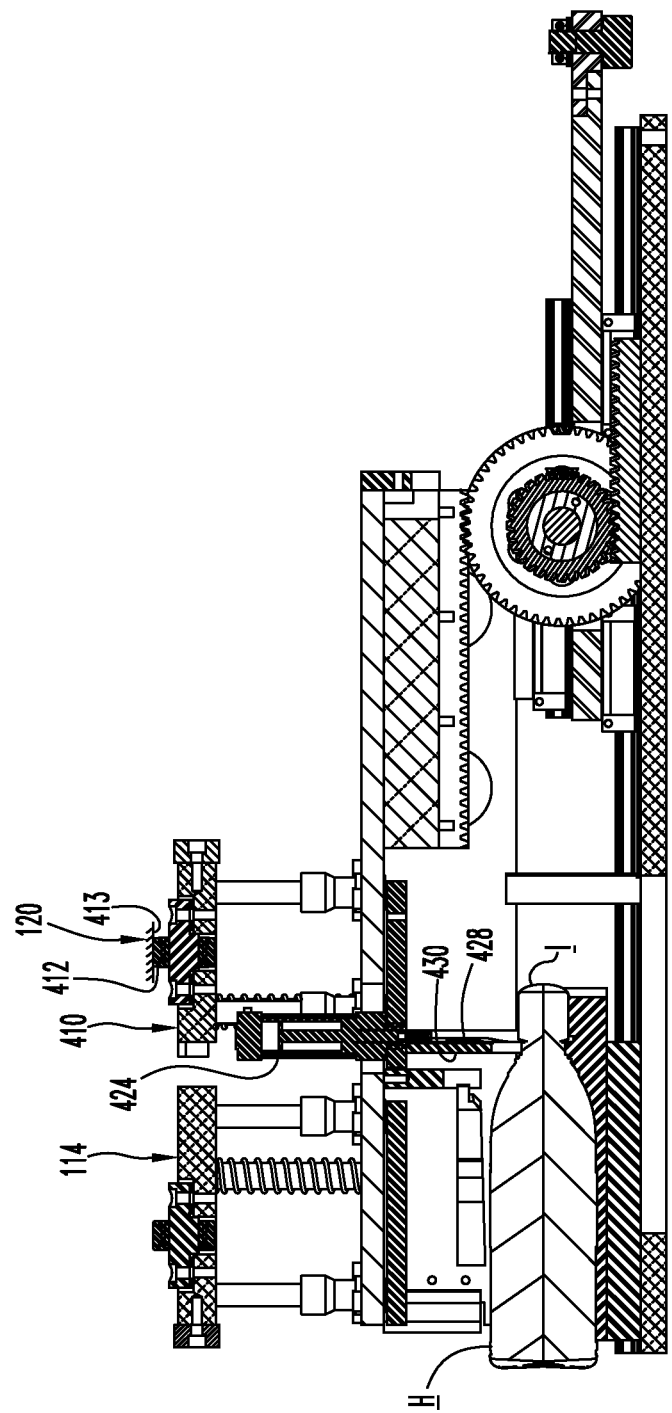
FIG. 4 is similar to FIG. 2 but illustrates the flash station after the flash has been trimmed and immediately before the blow dome trim assembly begins its stroke to trim the blow dome from the neck of the log.

After the flash K is trimmed from the bottle log I and the flash punch assembly 114 has returned to its raised position, continued rotation of the wheel 24 places the blow dome trim assembly 410 in its extended operating position over the bottle log H as shown in FIG. 4 in preparation for trimming the blow dome I. The drive assembly 116 is modified from that shown in the '486 patent to provide for a longer stroke that enables the cam follower 126 to move the blow dome assembly 410 over the bottle log H as shown in FIG. 4. The flash punch assembly 114 has sufficient clearance to move over the body of the body log H.

The neck support plate 430 is spaced from and located immediately above the neck I of the bottle log. See also FIG. 7. The pneumatic cylinder 424 is in its retracted condition, with the guillotine blade 428 immediately above the connection of the blow dome J with the neck I.

Figure 5:
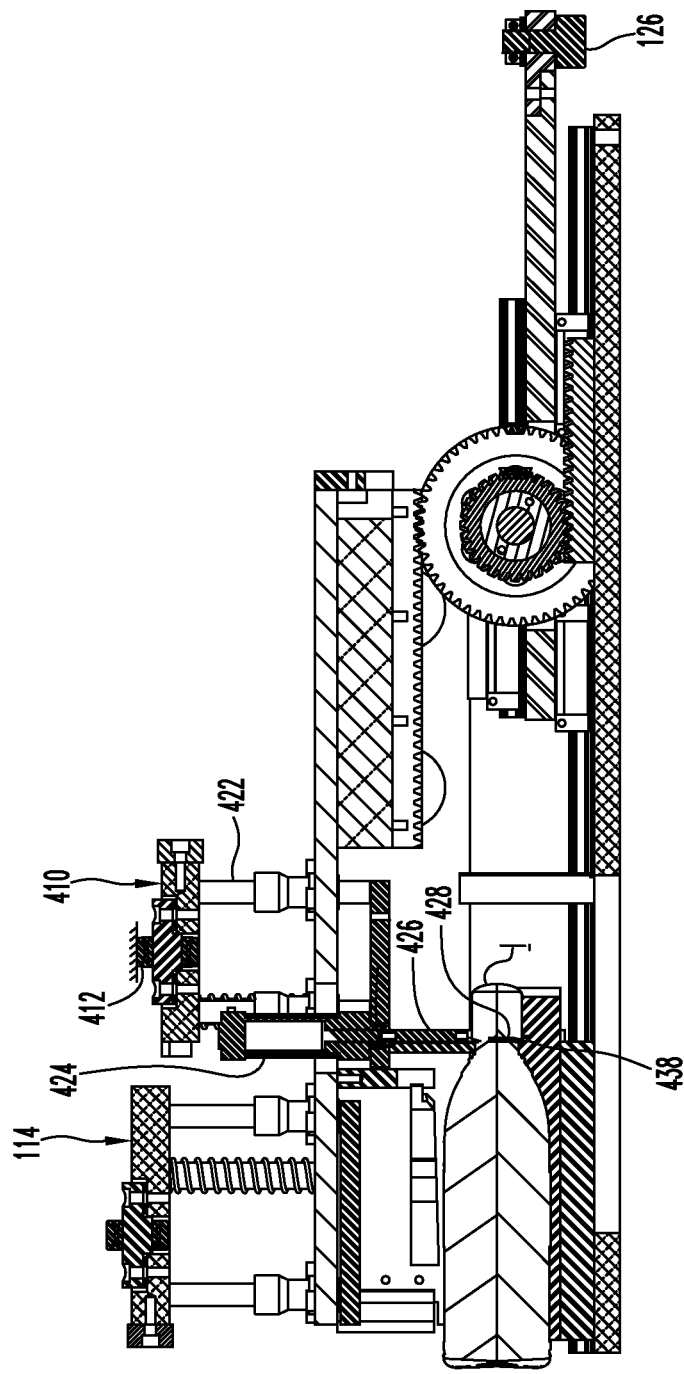
FIG. 5 is similar to FIG. 4 but illustrates the blow dome trim assembly at the end of its stroke and with the guillotine blade extended to trim the blow dome from the neck of the log.

The cam follower 412 then forces the blow dome trim assembly 410 to move in its stroke along the guide posts 422 to a lowered position shown in FIG. 5. The neck ring I is closely received within the neck support plate 430 as shown in FIG. 8, with the neck support plate side walls 436 extending down to the top of the of the log holder neck support portion 416. The curved wall sections 414, 434 of the neck support portion 416 and the neck support plate 430 provide essentially continuous support of the entire circumference of the neck ring I.

After the blow dome trim assembly 410 is lowered to provide support for the entire neck I, the pneumatic cylinder is actuated to quickly extend the piston rod 426 and move the guillotine blade 428 through the log H, severing the blow dome J from the neck I. The neck support plate 430 helps support the blade 428 as the blade cuts through the blow dome to assure a clean cut perpendicular to the longitudinal axis of the neck. A recess or blade groove 438 in the neck support plate 104 allows the guillotine blade 430 to pass through the entire thickness of the blow dome.

The pneumatic cylinder 424 is then actuated to retract the piston rod and the cam follower 412 returns the blow dome trim assembly to its raised position. The cam follower 126 then returns the assemblies 114, 410 back to their retracted positions shown in FIG. 2 for ejection of the flash-trimmed and blow dome-trimmed bottle log from the log holder 98.

Wheel 24 is designed to receive untrimmed logs from a first transfer wheel 22 and to discharge trimmed bottles to a second transfer wheel 26, see FIG. 9. The wheels 22, 24, and 26 operate at a high production speed with an output of 200 trimmed bottles per minute. A description of the transfer wheels 22 and 28, and how logs and trimmed bottles are transferred between the transfer wheels 22, 28 and the wheel 24 is provided in the '486 patent and so will not be repeated here.

Untrimmed logs and subsequently trimmed bottles are held in place on each of the wheels 22, 24, and 26 during movement of the logs along a continuous arcuate path 320 at a constant speed. FIG. 9 illustrates the path of movement of log H from an infeed conveyor 32 to a discharge conveyor 34. The portions of the path 320 shown in FIG. 9 defined by rotation of the wheels 22, 24, and 26 are also indicated in FIG. 9 by those reference numbers 22, 24, and 26.

Arcuate path 320 extends from infeed end 322 where the log is picked up by wheel 22 from conveyor 32 and extends continuously around arcuate portions 324, 326, and 328 on wheels 22, 24, and 26 respectively to discharge point 330 where the trimmed bottles are placed on discharge conveyor 34. Wheels 22, 24, and 26 support the logs and bottles in nests located a distance r from the axis of rotation of the wheel. Wheels 22, 24, and 26 are rotated at the same circumferential speed so that the logs are moved along path 320 at the same speed. The logs are held on the wheels 22, 24, and 26 with the neck axes D extending transversely to the direction of movement along path 320 and parallel to the rotational axes of the wheels.

Figure 10:
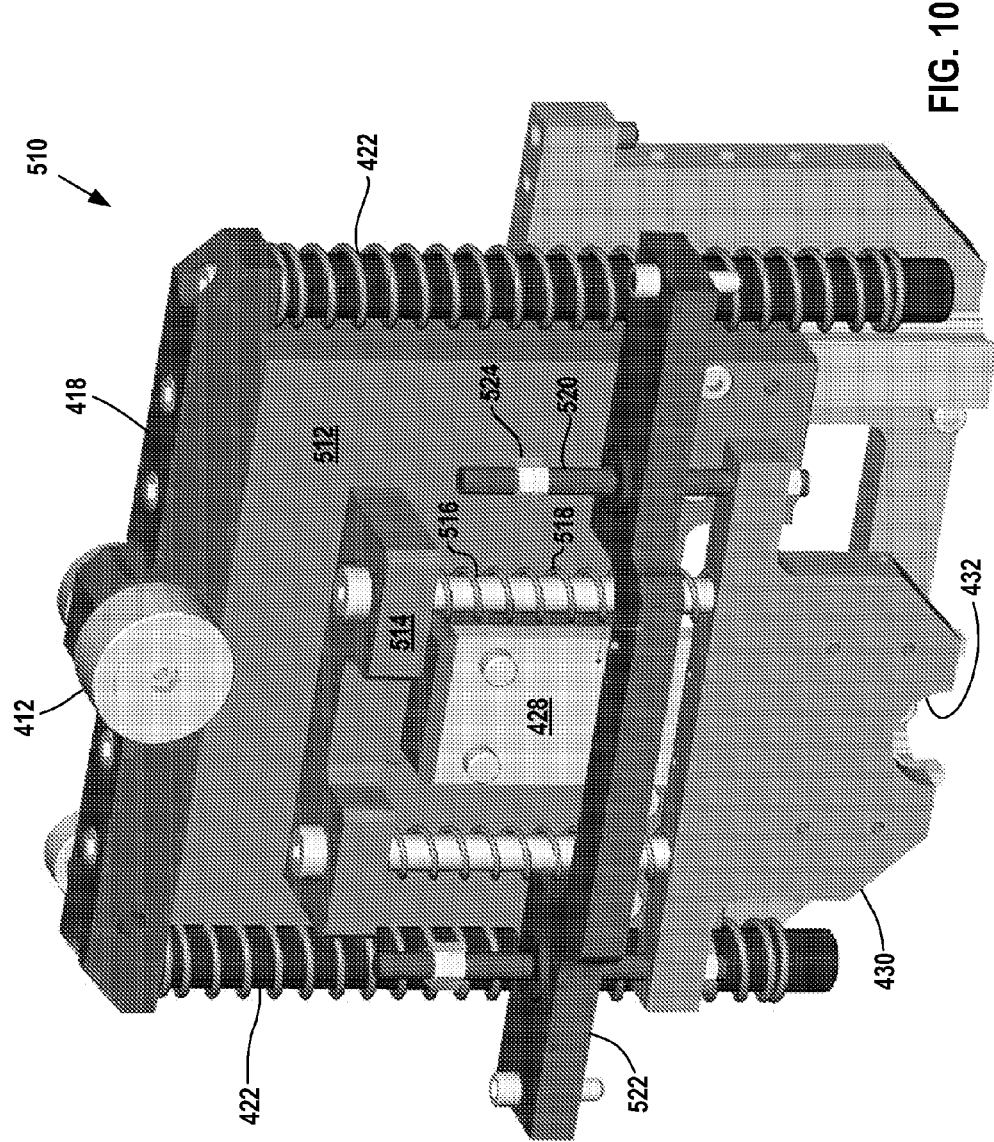
FIG. 10 illustrates a portion of a second embodiment blow dome trim assembly in accordance with the present invention immediately before the trim assembly begins its stroke to trim the blow dome from the neck of a log.
Figure 11:
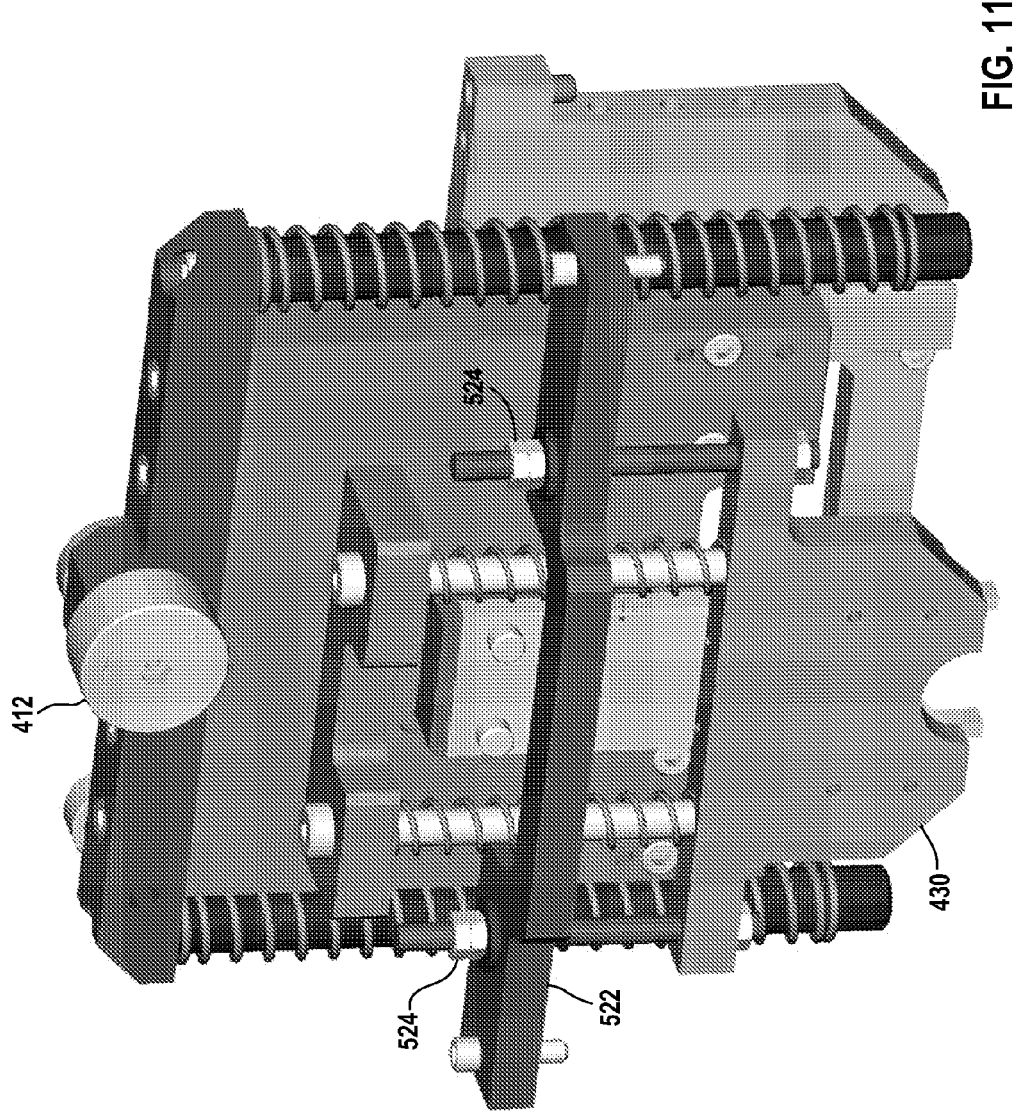
FIG. 11 is similar to FIG. 10 but illustrates the blow dome trim assembly in an intermediate position along its stroke.
Figure 12:
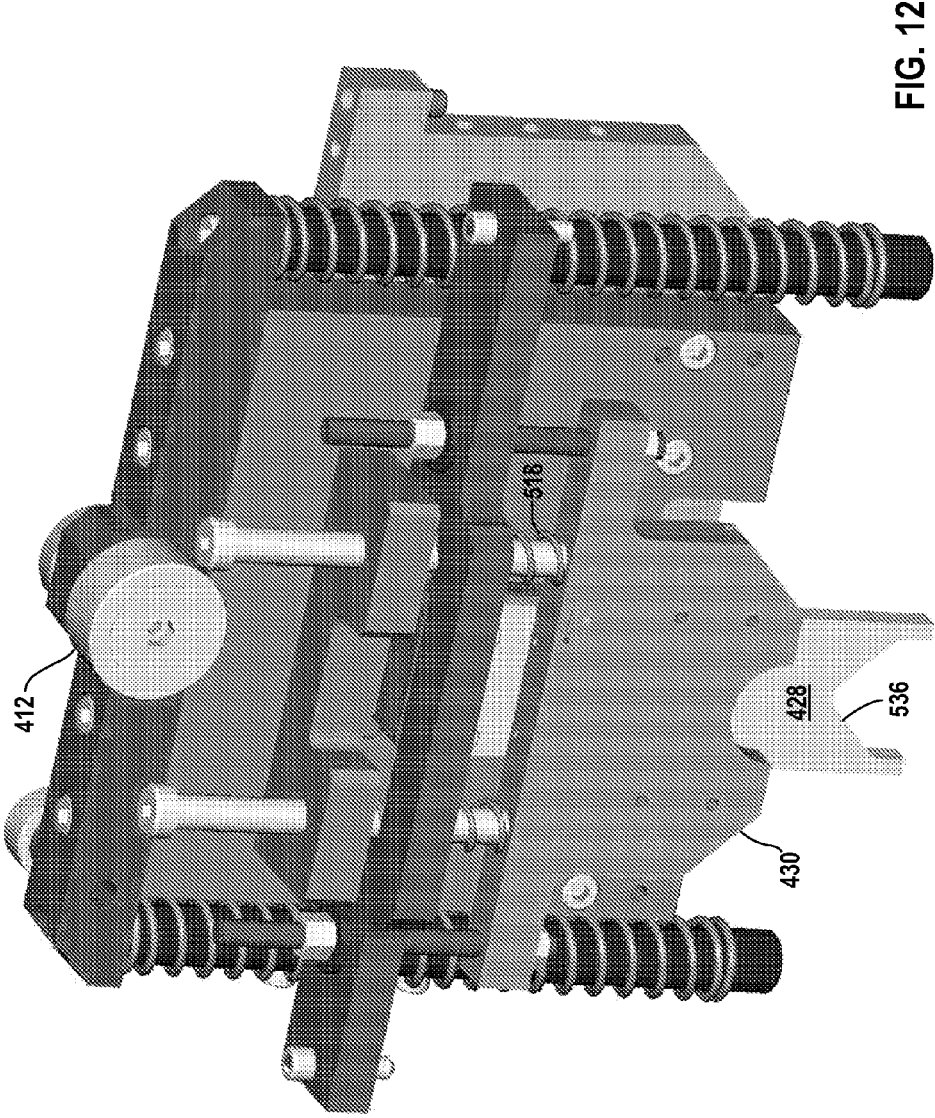
FIG. 12 is similar to FIG. 10 but illustrates the blow dome trim assembly at the end of its stroke and with the guillotine blade extended to trim the blow dome from the neck of the log.
Figure 13:
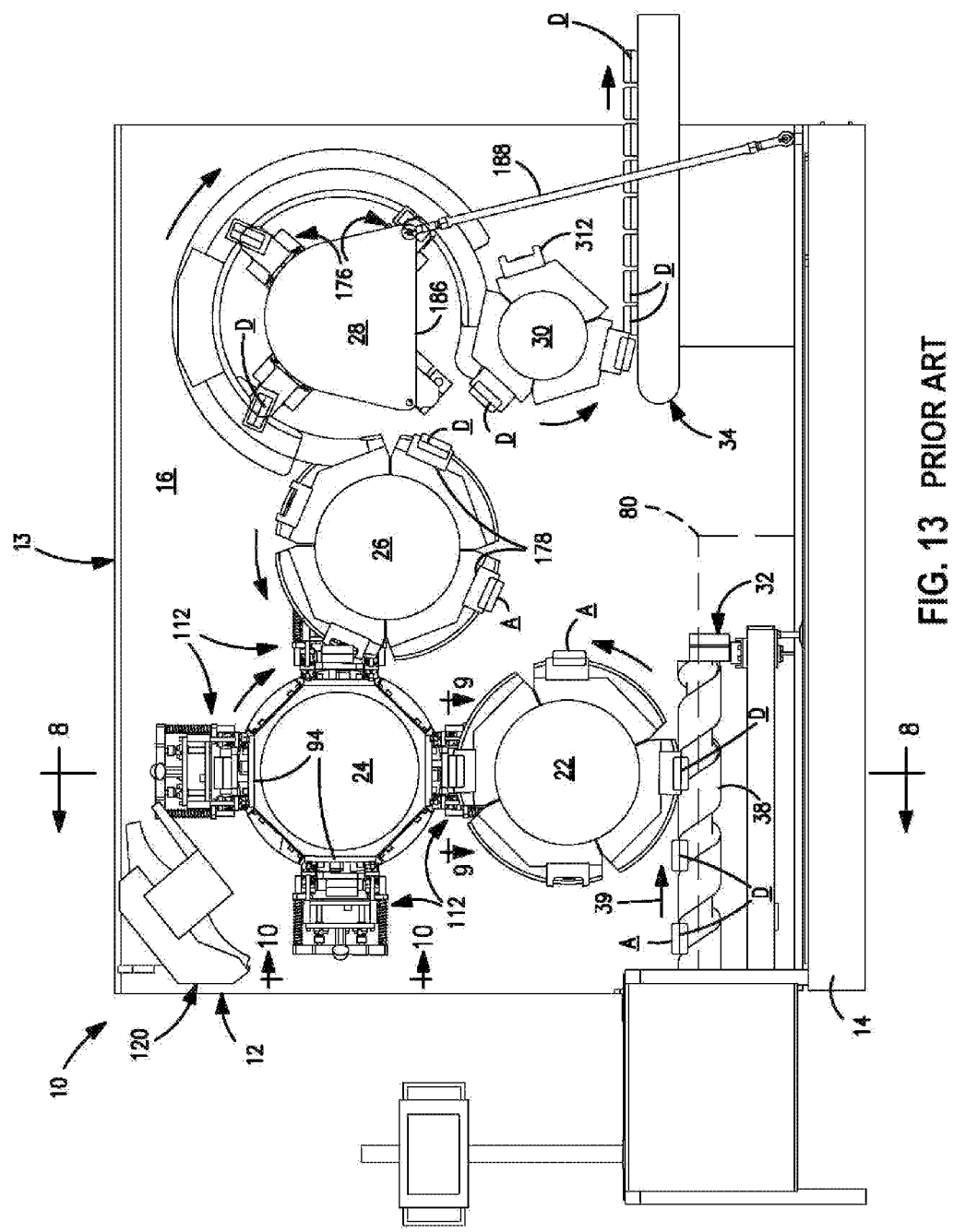
FIGS. 13 and 14 illustrate the rotary trimmer disclosed in the '436 patent.
Figure 14:
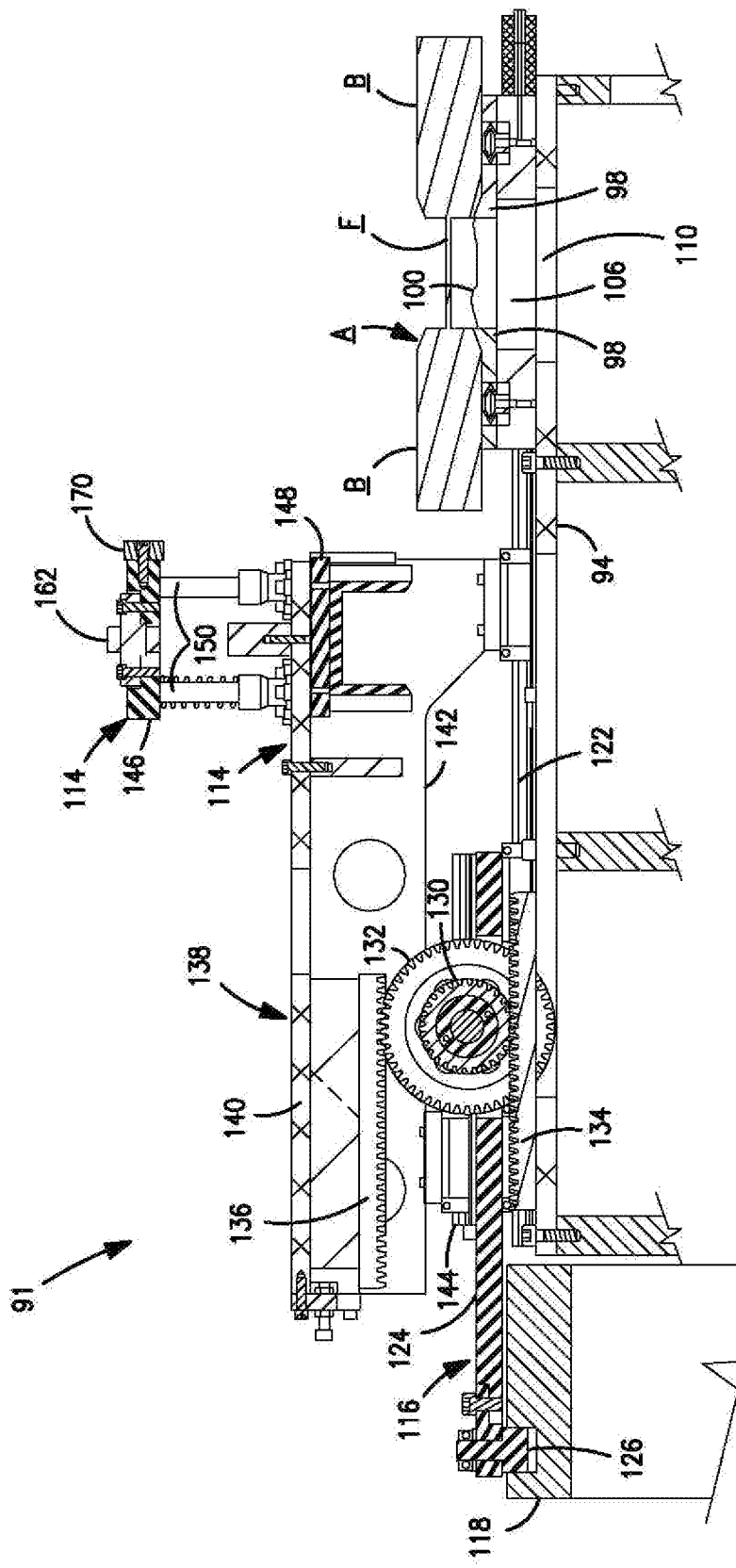

FIGS. 10-12 illustrate a second embodiment blow dome trim assembly 510 that can replace the trim assembly 410. This embodiment simplifies construction of the blow dome trim assembly by eliminating the pneumatic cylinder 424—the radial stroke of the guillotine blade 428 is equal to the radial stroke of the cam follower 416.

The blow dome trim assembly 510 includes a slide plate 512 attached to the top plate 418 and extending between the guide posts 422. The elongate guillotine blade 428 is fixedly attached to the slide plate 512 for conjoint movement with the plate 512 and extends parallel with the guide posts 422. The lower, cutting end portion of the guillotine blade 428 extends outwardly beyond the slide plate 512.

An upper mounting bracket 514 is fixedly attached to the plate 512 on the same side of the plate 512 as the guillotine blade 428. The bracket 514 carries a pair of secondary guide posts 516 that are closely received in bores of the bracket 514 and enable relative movement of the bracket 514 along the length of the guide posts 516. Fixedly attached to the lower ends of the guide posts 516 is the upper neck support plate 430. Compression springs 518 extending along the posts 516 urge the neck support plate 430 away from the bracket 514. The guide posts 516 are spaced from the side plate 512 such that the neck support plate 430 is immediately adjacent the guillotine blade 428.

A pair of elongate rods 520 extend through bores in the neck support plate 420 and are aligned outwardly of and parallel with the guide posts 516. The rods 520 also extend through bores in a fixed bracket 522 that permit relative axial movement of the bracket 522 along the rods 520. The bracket 522 is fixed with respect to the carrier plate 140 and is at a fixed radial distance from the log holder 98 during operation of the blow dome trim assembly 510. Mounted on each rod 520 on the opposite side of the bracket 522 from the neck support plate 430 is a set of stop nuts 524 that will engage the fixed bracket 522 and limit relative axial movement of the neck support plate 430 away from the fixed bracket 522.

FIG. 10 illustrates the blow trim assembly 510 in its raised position, similar to the position of the blow trim assembly 410 shown in FIG. 4. The springs 518 locate the upper neck support plate 430 away from the upper mounting bracket 514, with the neck support surface 432 spaced outwardly beyond the cutting edges of the guillotine blade 428. The stop nuts 524 are spaced away from the fixed bracket 522.

At the appropriate point in the rotation of the wheel 24 the cam follower 412 forces the blow dome trim assembly 510 to move in its stroke along the guide posts 422. The springs 516 force the upper neck support plate 430 to move with the upper bracket 514 along the stroke until the stop nuts 524 contact the fixed bracket 522 as shown in FIG. 11, preventing further movement of the upper neck support plate 430 along the stroke. At this point the neck support plate 430 is closely spaced from the neck I and cooperates with the log holder neck support portion 416 to provide essentially continuous support of the entire circumference of the neck ring I as previously described during the remainder of the stroke. The guillotine blade 428 is spaced slightly away from the neck ring I.

The cam follower 412 continues its downward stroke from the intermediate position shown in FIG. 11 to the lowered position shown in FIG. 12. As described, the neck support plate 430 does not move along this portion of the stroke. The springs 518 are compressed between the neck support plate 430 and upper bracket 514 with continued movement of the slide plate 512 along the stroke. The guillotine blade 428 moves through the log H, severing the blow dome J from the neck I. The radial stroke length of the cam follower 412 when used with the trim assembly 510 is longer than when used with the trim assembly 410 since the stroke must be sufficient on its own to move the guillotine blade 428 through the log H.

After trimming the blow dome, the cam follower 412 then returns the blow dome trim assembly 510 back to the raised position shown in FIG. 10. The springs 516 urge the neck support plate 430 away from the upper bracket 514, returning the neck support plate 430 to its original position relative to the bracket 514. The cam follower 126 then returns the entire assembly to its retracted position (corresponding to the position shown in FIG. 2) for ejection of the trimmed log from the log holder 98.

In alternative embodiments of the invention the trim station could include only a blow dome trim assembly 410 or 510 and the flash punch trim assembly 114 is eliminated. In yet other embodiments the log holder 98 can be stationary rather than mounted on a wheel. The illustrated neck support surfaces are concave surfaces and closely conform to the convex shape of the bottle neck L; the neck support surfaces can be flat or even convex surfaces in other embodiments in order to conform to other possible shapes of the bottle neck.

The illustrated embodiments illustrate trimming flash from the plastic log in addition to trimming the blow dome from the neck of the plastic log. In yet other embodiments other trimming operations known in the blow-molded plastic bottle art could be performed in addition to trimming the blow dome.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

The invention claimed is:

1. An assembly for trimming a blow dome from a neck of a plastic bottle forming a portion of a plastic blow molded log discharged from a blow mold, the assembly comprising:
   a log holder;
   a carrier, a blade, and a neck support plate, the blade comprising a cutting edge;
   the carrier being movable with respect to the log holder along an axis between a retracted position and an extended position spaced from the retracted position, the blade and the neck support plate carried by the carrier for movement with the carrier between retracted and extended positions, the blade and the neck support plate being positioned over the log holder when the carrier is in the extended position and the carrier, blade, and neck support plate being away from the log holder when the carrier is in the retracted position;
   the log holder being disposed and adapted to receive and hold the log stationary during trimming of the log, the log holder comprising a neck support portion fixed with respect to the remainder of the log holder, the neck support portion being disposed and shaped to receive and support a first portion of the neck of the plastic bottle when the log is held in the log holder;
   the blade being movable with respect to the carrier transverse to the axis between a raised position and a lowered position spaced from the raised position of the blade, the cutting edge of the blade on a leading end of the blade as the blade moves from the raised position to the lowered position;
   the neck support plate being movable with respect to the carrier transverse to the axis between a raised position and a lowered position spaced from the raised position of the plate, the neck support plate being adapted to surround and support a second portion of the neck of the plastic bottle and cooperate with the neck support portion of the log holder in supporting the neck of the plastic bottle when the log is held in the log holder and the neck support plate is in the lowered position with the carrier is in the extended position;
   a carrier drive operatively connected to the carrier for moving the carrier between said retracted and extended positions;
   a blade drive operatively connected to the blade for moving the blade between said raised and lowered positions of the blade;
   a plate drive operatively connected to the neck support plate for moving the neck support plate between said raised and lowered positions of the neck support plate;
   the blade and neck support plate being spaced from the log holder each a respective first distance in a first direction when the blade and neck support plate are each in the raised position;
   the blade and neck support plate overlaying the log holder in the first direction when the carrier is in the extended position;
   the blade moving towards the log holder when the blade is moving from the raised position to the lowered position when the carrier is in the extended position; and
   the neck support plate moving towards the log holder when the neck support plate is moving from the raised position to the lowered position when the carrier is in the extended position.

2. The assembly of claim 1 wherein the neck support plate and the neck support portion of the log holder comprise facing curved surfaces that are shaped to provide essentially continuous support of the neck of the plastic bottle when the log is held in the log holder and the neck support plate is in the lowered position with the carrier is in the extended position cooperatively support the neck of the plastic bottle.

3. The assembly of claim 1 wherein the blade drive comprises a cylinder and piston rod, the blade attached to the piston rod.

4. The assembly of claim 1 wherein the blade drive and the plate drive comprise in common a cam follower and a cam surface guiding said cam follower.

5. The assembly of claim 1 wherein the log holder is fixedly mounted on a wheel that rotates about an axis.

6. The assembly of claim 1 wherein the blade drive comprises at least one spring bearing against the neck support plate, the neck support plate relatively movable with respect to said spring.

7. The assembly of claim 1 comprising a log carrier that continuously moves the log holder along a closed path, the log holder fixedly attached to the log carrier.

8. The assembly of claim 1 wherein the carrier is spaced away from the log holder and the carrier, blade, and neck support plate do not overlay the log holder in said first direction when the carrier is in the retracted position.

9. The assembly of claim 1 wherein the carrier also carries a flash punch.

* * * * *